United States Patent [19]

Lee

[11] Patent Number: 5,741,004
[45] Date of Patent: Apr. 21, 1998

[54] SHIFT VALVE FOR AN AUTOMATIC TRANSMISSION USED IN AUTOMOBILES

[75] Inventor: Kyung-Chul Lee, Kyunggi-do, Rep. of Korea

[73] Assignee: Kia Motors Corporation, Seoul, Rep. of Korea

[21] Appl. No.: 681,826

[22] Filed: Jul. 30, 1996

[30] Foreign Application Priority Data

Jun. 4, 1996 [KR] Rep. of Korea .................. 96-19722

[51] Int. Cl.[6] ........................................ F16K 31/06
[52] U.S. Cl. ........................... 251/129.07; 251/282
[58] Field of Search ................ 251/282, 129.07, 251/129.15

[56] References Cited

U.S. PATENT DOCUMENTS

| | | | |
|---|---|---|---|
| 2,831,650 | 4/1958 | Richardson | 251/129.07 |
| 3,570,806 | 3/1971 | Sturman | 251/282 X |
| 3,756,558 | 9/1973 | Okui | 251/282 |
| 4,471,811 | 9/1984 | Kawabata et al. | 251/282 X |
| 4,796,854 | 1/1989 | Ewing | 251/129.07 |
| 5,029,513 | 7/1991 | Duffy | 251/282 X |

*Primary Examiner*—Kevin Lee

[57] ABSTRACT

Disclosed is a shift valve of a line pressure control system of an automatic transmission used in vehicles. The shift valve comprises a first input line having an orifice; a plug which communicates with the first input line through the orifice; a second input line; an output line which communicates with a hydraulic pressure cylinder; a valve spool for selectively communicating with the second input line and the output line with each other; and an elastic member for balancing the valve spool and the plug.

3 Claims, 2 Drawing Sheets a : piston free movement time
b : clutch engaging time a : piston free movement time
b : clutch engaging time 5,741,004

SHIFT VALVE FOR AN AUTOMATIC TRANSMISSION USED IN AUTOMOBILES

FIELD OF THE INVENTION

The present invention relates to a shift valve for an automatic transmission used in automobiles, and more particularly, to a shift valve of an automatic transmission used in vehicles which, which has an accumulator combined therewith and can maintain optimal line pressure for pushing a clutch piston.

BACKGROUND OF THE INVENTION

Automobile transmissions are used on many rear wheel-drive and four-wheel drive vehicles. Automatic transaxles combine the transmission and final drive assembly into a single unit and are used on many front-wheel-drive and some rear-wheel drive vehicles.

A planetary gear system provides the various forward speed and reverse. Gear action is controlled by several multiple-disc clutches, one-way clutches, and bands. Hydraulic pressure is used to operate the clutches and bands. The valve body contains a number of valves which control the flow direction and the pressure of the transmission fluid.

A number of multiple-disc clutches, one-way roller clutches, bands, a compound planetary gear set, and a hydraulic control system provide the means for the various gear ratios.

The shift valves respond to governor pressure and throttle pressure to provide the automatic upshifts and downshifts at the desired speeds. These valves are simply on-off valves controlling the flow of line pressure to the first-to-second, second-to-third, and third-to-fourth shift circuit.

Upshifts and downshifts are controlled electronically on some automatic transmissions. In this system the shift valves are actuated by electric solenoids. An electronic control module tells the solenoids when to upshift or downshift in response to signals received from sensors which indicate engine speed, engine load, throttle position, vehicle speed, intake manifold pressure and programmed information stored in the control module.

Several different devices are used in automatic transmissions to control shift timing and quality. Application of clutches and bands is cushioned by such devices as an orifice or an accumulator piston or valve. An accumulator in the apply circuit is used with a spring-loaded valve or piston. The piston or valve is forced to move against spring pressure during clutch or band engagement, thereby absorbing some of the apply pressure and cushioning the shift.

FIG. 1 shows a conventional shift valve 10, electric solenoids 20 for actuating the shift valve 10, and an accumulator 30. Hydraulic pressure supplied to the shift valve 10 which is activated by the electric solenoids 20 passes through the accumulator 30 and is supplied to a clutch piston (not shown) which pushes a driven clutch to a driving clutch for engagement. As the hydraulic pressure is elastically controlled to be relieved in the accumulator 30, the control of line pressure is able to be realized.

However, because the above prior art line pressure control system for automatic transmissions used in vehicles is structured such that the line pressure is controlled only by the accumulator 30 during upshifts and downshifts, not only is control of line pressure past the sphere of operational stroke of the accumulator 30 not possible, but when excessive line pressure is exerted, line pressure is controlled insufficiently, resulting in shift shock. Especially, when the stroke of the accumulator 30 cannot absorb hydraulic pressure, that is, when the accumulator plate remains fully compressed, hydraulic pressure applied to the clutch piston may rises quickly, resulting in a transmission shock. In order to avoid such a situation, it is possible to enlarge the accumulator, but this may force the transmission case to be enlarged or a space for the accumulator bigger.

The pattern in change of pressure of the automatic transmission, in which the line pressure is controlled by the accumulator 30, is shown in the graph of FIG. 2.

The graph of FIG. 2 illustrates the pressure change pattern in the hydraulic pressure cylinder for engaging driven clutch and driving clutch with each other in the automatic transmission body. When the hydraulic pressure is applied to the hydraulic pressure cylinder or the piston chamber having the clutch piston by the movement of spool valve of the shift valve 10, the hydraulic pressure is increased to an amount, then in the clutch engagement interval 'b', hydraulic pressure quickly rises, which results in shift shock.

SUMMARY OF THE INVENTION

The present invention has been made in an effort to solve the above problems.

It is an object of the present invention to provide a line pressure control system of an automatic transmission used in vehicles which can reduce shift shock during speed shift.

It is another object of the present invention to reduce the space of the accumulator of the transmission used in vehicles.

To achieve the above objects, the present invention provides a shift valve of a line pressure control system of an automatic transmission used in vehicles comprising: a first input line having an orifice; a plug which communicates with the first input line through the orifice; a second input line; an output line; a valve spool for selectively communicating the second input line and the output line with each other; and an elastic member for balancing the valve spool and the plug.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENT

Preferred embodiments of the present invention will now be described in detail with reference to the accompanying drawings.

Figure 1:
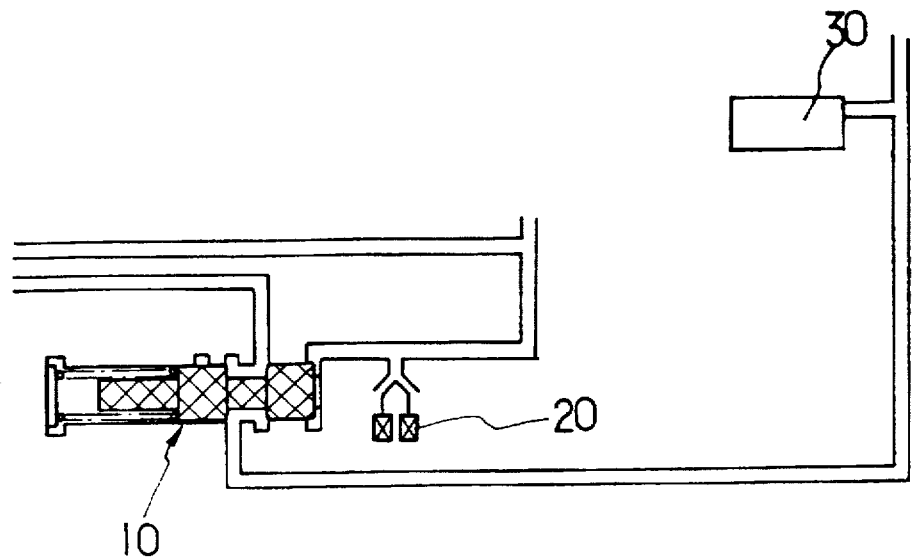
FIG. 1 is a schematic drawing illustrating a shift valve and an accumulator used in a line pressure control system of a general automatic transmission.
Figure 3:
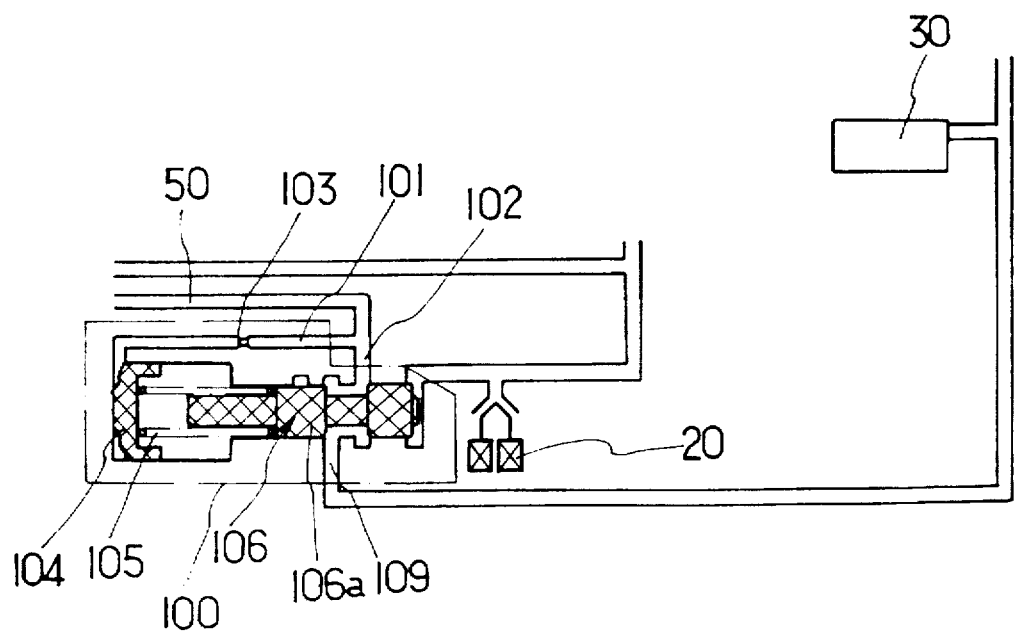
FIG. 3 is a schematic drawing illustrating a shift valve according to the present invention and the accumulator shown in FIG. 1.

FIG. 1. shows a shift valve 100 according to the present invention, including solenoids 20 for activating the shift valve 100, and an accumulator 30. Hydraulic pressure supplied to the shift valve 100 which is activated by the electric solenoids 20 passes through the accumulator 30 and is supplied to a hydraulic cylinder (not shown) for engaging a driven clutch and a driving clutch with each other.

The shift valve 100 comprises a first input line 101 having an orifice 103; a plug 104 which communicates with the first input line 101 through the orifice 103; a second input line 102; an output line 109 which communicates with the accumulator 30; a valve spool 106 having a plurality of lands 106a for selectively communicating the second input line 102 and the output line 109 with each other; and an elastic member or a spring 105 for balancing the valve spool 106 and the plug 104, as shown in FIG. 1.

The shift valve 100 of this embodiment has two input lines or two input ports 101 and 102 which communicates with a hydraulic pump (not shown) through a supply line 50. That is, the supply line 50 is divided into two lines 101 and 102 for communicating with the shift, valve 100. One of the input lines, a first input line 101 has an orifice 103 which can reduce the hydraulic pressure from the hydraulic pump. Through the orifice 103 a plug 104 supported by an elastic member or a spring 105 communicates with the first input line 101.

The other side of the spring 105 supports one side of a land 106a of the valve spool 106 which selectively communicates the second input line 102 to the output line 109 by the action of the solenoids 20.

When the solenoids 20 upshift, the hydraulic pressure is applied to the valve spool 106 which is then pushed to the left.

When the solenoids 20 downshift, the hydraulic pressure is no longer applied to the valve spool 106 and the valve spool 106 maintains the right-most position under the bias of spring 105. The output line 109 of the shift valve 100 communicates with the accumulator 30 which relieves hydraulic pressure before entering the hydraulic pressure cylinder.

When the hydraulic pressure of the oil pump is transmitted to the shift valve 100 according to the present invention through the supply line 50, a portion of the oil passes into the shift valve 100 through the first input line 101 and the other portion of the oil passes into the shift valve 100 through the second input line 102. The oil entered into the shift valve 100 through the first input line 101 passes through the orifice 103 which reduces the pressure of the oil and retard the passing time of the oil.

But, excessive hydraulic pressure is applied to the shift valve 100, the oil passed through the orifice 103 pushes the plug 104 which is elastically supported by the spring 105. In response to the movement of the spring the valve spool 106 receives pressure in the direction of the plug 104. And the other portion of the oil entered into the shift valve 100 through the second input line 102 pushes the valve spool 106 in the direction of the plug 104.

The hydraulic pressure of the oil entered into through the second input line 102 is higher than that of the oil entered into through the first input line 101 due to the orifice 103. Thus, the valve spool 106 is pushed in the direction of the plug 104 and communicating the second input line 102 and the output line 109 with each other. But, excessive hydraulic pressure exerted to the shift valve 100 is much relieved and absorbed.

The effect of the shift valve 100 explained above is well illustrated in FIG. 4 which shows change of pressure in the hydraulic pressure cylinder for engagement of the clutches during a speed shift in the automatic transmission having the shift valve 100.

Figure 2:
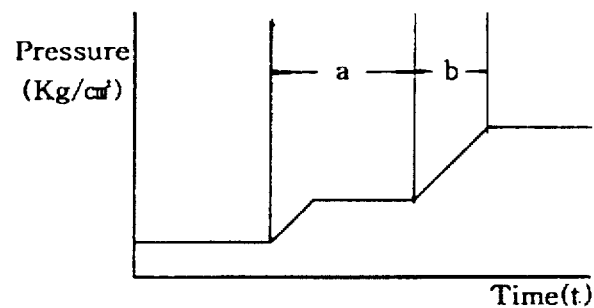
FIG. 2 is a graph showing change of pressure in the hydraulic pressure cylinder during a speed shift in the automatic transmission having the shift valve and the accumulator of FIG. 1.
Figure 4:
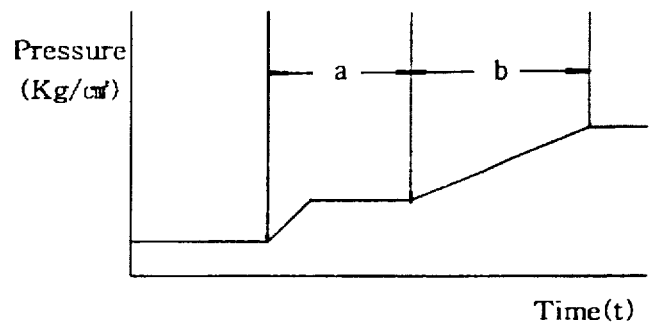
FIG. 4 is a graph showing change of pressure in the hydraulic pressure cylinder for engagement of the clutches during a speed shift in the automatic transmission having the shift valve and the accumulator of FIG. 3.

In the graph of FIG. 4, when the hydraulic pressure is applied to the hydraulic pressure cylinder or the piston chamber having the clutch piston by the movement of spool valve 106 of the shift valve 100, the hydraulic pressure is increased to an amount as in FIG. 2, then in the clutch engagement interval 'b', hydraulic pressure slowly rises in comparison with the graph of FIG. 2, which means that the shift valve 100 retard the quick rise of the hydraulic pressure.

As explained above, the shift valve 100 is advantageous in relieving the shift shock or absorbing it, which means that the size of the accumulator 30 can be compact. Also, due to compactness of the accumulator 30 the size of the automatic transmission can be smaller than before.

While this invention has been described in connection with what is recently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A shift valve of a line pressure control system of an automatic transmission used in vehicles comprising:

a first input line having an orifice;

a plug which communicates with said first input line through the orifice;

a second input line;

an output line which communicates with a hydraulic pressure cylinder;

a valve spool for selectively communicating said second input line and said output line with each other; and an elastic member for balancing the valve spool and said plug.

2. The shift valve of claim 1, wherein said valve spool is activated by electric solenoids.

3. The shift valve of claim 1, wherein said elastic member is a spring member.

* * * * *